United States Patent [19]

Trammell et al.

[11] Patent Number: 4,649,726
[45] Date of Patent: Mar. 17, 1987

[54] RADIO-TELEMETRY INCLINOMETER

[75] Inventors: William M. Trammell, 510½ E. 9th St., P.O. Box 327, Claremore, Okla. 74017; Criswell G. Hutchens, Tulsa, Okla.; John R. Gilliland, Tulsa, Okla.; Stanton R. Hill, Tulsa, Okla.

[73] Assignee: William M. Trammell, Claremore, Okla.

[21] Appl. No.: 774,283

[22] Filed: Sep. 9, 1985

[51] Int. Cl.$^4$ .......................... B21C 1/24; B21C 51/00
[52] U.S. Cl. ............................................. 72/34; 72/9; 72/388
[58] Field of Search .................... 72/9, 11, 34, 388, 31

[56] References Cited

U.S. PATENT DOCUMENTS

| 3,333,445 | 8/1967 | Mergler et al. | 72/9 |
| 3,335,588 | 8/1967 | Cummings | 72/388 |
| 4,196,607 | 4/1980 | Youtsey et al. | 72/34 |

Primary Examiner—W. D. Bray
Attorney, Agent, or Firm—William S. Dorman

[57] ABSTRACT

A system for determining the bend in a section of a pipe which comprises supporting the pipe section on a conventional pipe bending apparatus which consists essentially of a device for holding the pipe section in a relatively horizontal position, for maintaining a first end of the pipe section in a relatively fixed position and for exerting a transverse force against a second and opposite end of the pipe section for creating a bend in the pipe section between the two ends thereof; mounting a first transducer on the first end of the pipe section, the first transducer providing a variable voltage depending upon the angle of the first end of the pipe section relative to the horizontal, mounting a second transducer on the second end of the pipe section, the second transducer providing a variable voltage depending upon the angle of the second end of the pipe section relative to the horizontal, exerting a bending force at the second end of the pipe section to create a bend in the pipe section between the two ends thereof, converting the voltage produced by the first transducer into a first radio frequency signal whose frequency varies with the strength of the voltage produced by the first transducer, converting the voltage produced by the second transducer into a second radio frequency signal whose frequency varies with the strength of the voltage produced by the second transducer, receiving the first and second radio frequency signals in a receiver capable of determining the difference in frequency between the two signals, differentiating the two radio frequency signals in the receiver, and providing a readout based upon this differentiation in terms of the angular difference between the two ends of the pipe section.

3 Claims, 10 Drawing Figures

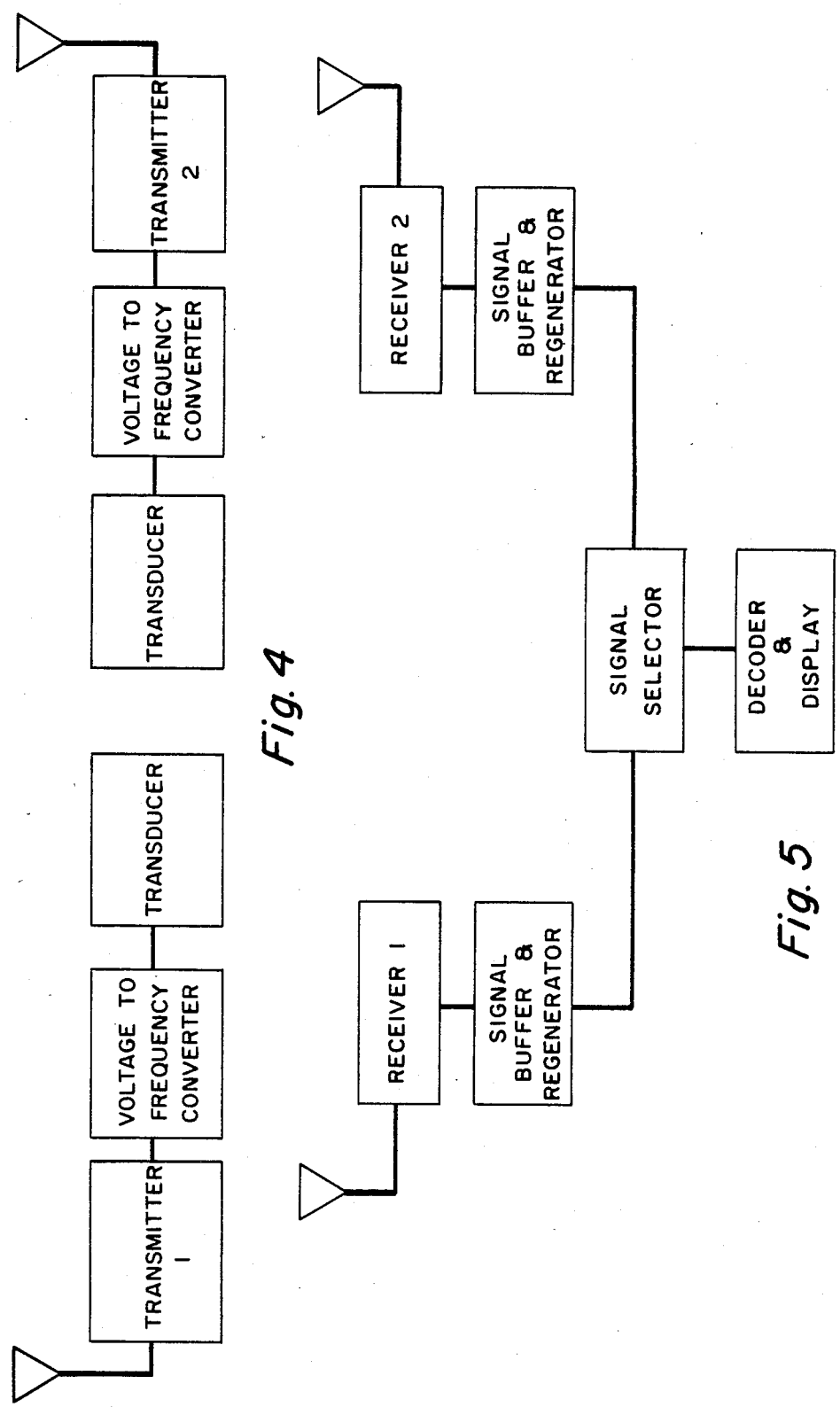

RADIO-TELEMETRY INCLINOMETER

BACKGROUND OF THE INVENTION

1. Field of the Invention

The present invention relates to a device for determining the bend in a pipe. More particularly, the present invention relates to such a device which is operated by radio telemetry.

2. Prior Art

In bending large diameter pipe, the ends of the pipe are anchored or supported against downward movement and the bending device, which is part of a large tractor unit, is adapted to urge a downward force against the upper surface of the pipe. By increasing the relative downward force and the upward force at one end of the pipe, the pipe will bend. Heretofore, the bending of the pipe was done in steps. That is, after a bending force was applied and the pipe appeared to bend somewhat, the force was removed and an angle measurement was made at the two opposite ends of the pipe using a device which is commonly known as a Abney level. The Abney level has to be adjusted manually but it does indicate, in degrees, how much one end of the pipe varies from the horizontal. The Abney level is placed at the upper portion of the pipe at one end thereof and a reading is taken. The Abney level is placed at the other end of the pipe and another reading is taken. The actual bend of the pipe is calculated by adding or subtracting the two readings. If the desired degree of bend is not achieved, the bending force is again applied and the operation is repeated. Obviously, this method of bending a pipe is awkward and time consuming.

A patentability search was conductd on the present invention and the following listed U.S. Patents were uncovered in the search: U.S. Pat. Nos. 2,366,346, 3,707,772, 2,772,411, 3,851,399, 2,785,477, 3,975,831, 2,824,381, 4,120,095, 2,842,863, 4,274,208, 2,907,116.

Malone U.S. Pat. No. 2,366,346 and Jysky U.S. Pat. No. 3,975,831 show pendulum type inclinometers with electrical outputs.

Cooper U.S. Pat. No. 2,772,411 shows a pendulum type boom angle indicator with electrical output; Edwards U.S. Pat. No. 3,851,399 shows electrical apparatus for equipment alignment on ships; and Lebourg U.S. Pat. No. 4,120,095 shows analogous apparatus and is of general interest.

Gregory U.S. Pat. No. 2,785,477, Traupmann U.S. Pat. No. 2,824,381, Hellwig U.S. Pat. No. 2,842,863, Rose U.S. Pat. No. 2,907,116, Cotter U.S. Pat. No. 3,707,772 and Yakkel U.S. Pat. No. 4,274,208 show mechanical pipe bending gauges.

Existing requirements of Federal and industry commissions stipulate that pipe bending in the field be performed with precision. Angle measuring capability of one-tenth of a degree is desired. This extreme accuracy is not now readily available. The method currently being employed is a rudimentary angle measurement done by having the machine operator crawl up the machine and shoot an angle with a level. This angle measurement procedure is unacceptable primarily due to the inherent time consumption involved. However, there are additional concerns which result from the prior art practices. For example, the machine operator is oftentimes tempted to shortcut the angle measuring drudgery by using his past experience as a basis. In some instances, the operator estimates the amount of bend he has applied by watching the bending unit's hydraulic pressure gauge. However, this indirect estimate method results in sone joints with incorrect bends—bends which exceed the angle desired. The joints have to be scrapped and the end result is a loss of money and a further delay in tine. Minimizing wasted time and material is a never ending battle in the pipeline laying industry.

SUMMARY OF THE INVENTION

The present invention involves a system for determining the degree of bend in a section of pipe by radio telemetry. The pipe section is first mounted on, or in, a conventional pipe bending apparatus which, as disclosed herein, includes a large tractor unit which serves to exert a downward force adjacent the center of the pipe section. At the same time, this tractor unit supports one end of the pipe and prevents downward movement. A smaller auxiliary tractor unit is adapted to engage and support the other end of the pipe and to exert an upward or lifting force against this end of the pipe.

A pair of pendulum type inclinometers of the present invention are mounted at the ends of the pipe section. Each pendulum has a potentiometer keyed to the support shaft of the pendulum. As the pipe bends, the pendulum will always seek a vertical position, but will cause relative rotation of its support shaft with consequent movement of the movable arm (not shown) of the potentiometer. Thus, as the pipe is bent, the angle of the inclination transmitter at the bending end changes, causing its pendulum inclination and its potentiometer voltage to change. Thus we have a relative voltage difference between the two transmitters. This is the information we will use to find the angle of bend on the pipe.

The pendulum type devices are incorporated into transmitting units which will transmit a radio frequency signal whose frequency will be determined by the degree of inclination measured by the pendulum type inclonometer.

A receiver is adapted to receive pulses from both transmitters. By means of an internal circuitry within the receiver, this receiver will be able to differentiate between the two frequencies and to provide a readout which will be the angular difference between the transmitters. The receiver will be mounted on the tractor unit adjacent to the operator. Thus, the operator can apply a bending force, release this force and check the readout. If the readout is less than the angle desired, the operator can immediately apply another force and repeat the operation until the precise angular bend is produced.

Considering the circuitry briefly, each transducer-transmitter is made up of four sections: (1) an angle encoding section (the transducer) which converts a position to a voltage, (2) a voltage to frequency converter which converts the angle to a frequency, (3) a buffer-amplifier section to properly interface and amplify the signal, and a (4) transmitter which will send the encoded angle to the receiver.

The receiver is made up of six blocks: two commercially obtained receivers to match, two square wave regenerators, and two power supplies (one for the receivers and one for a digital decoder.)

The output of the first receiver is the regenerated signal from the first transmitter. This signal is then the input to a first square wave regenerator. The output of the first square wave regenerator is sent to a digital decoder. The output of the second receiver is the regenerated signal from the second transmitter. This signal is then the input to a second square wave regenerator. The output of the second square wave regenerator is also sent to the digital decoder. The two power regulators are 12 Volt and 5 Volt supplies for the transmitters and the digital converter, respectively.

The digital decoder section consists of an updown counter, liquid cystal display (LCD), latches for the display, and timing and control circuits to initialize and integrate the previously mentioned circuits. The updown counter consists of integrated circuits. The timing and control circuits are made up of integrated circuits. The purpose of the digital decoder (and display) section is to access the difference between the two signals and and display this difference as the angle of bend.

BRIEF DESCRIPTION OF THE DRAWINGS

FIG. 4 shows a block diagram of the transducer-transmitter portion of the Radio-Telemetry Inclinometer (RTI) of the present invention;

FIG. 5 shows a block diagram of the receiver-decoder section of the present invention;

DETAILED DESCRIPTION OF THE PREFERRED EMBODIMENTS

Figure 1:
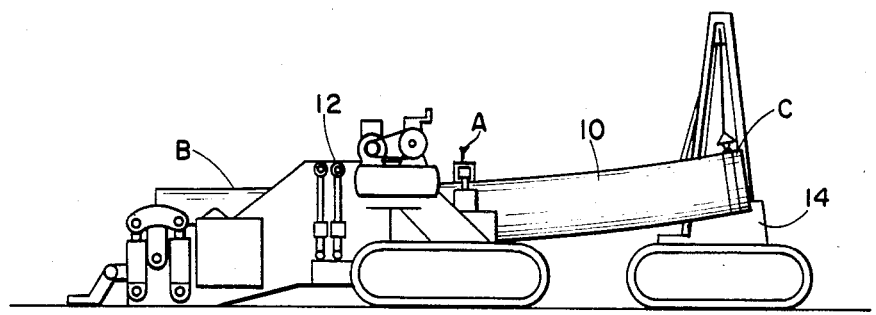
FIG. 1 is a semi-diagrammatic side elevation of a pair of tractor units holding a section of pipe to be bent.

Referring to the drawings in detail, FIG. 1 shows a pipe section or joint 10 held by a large tractor unit 12 which serves to exert a downward force at point A adjacent center of the pipe joint. At the same time, this tractor unit 12 supports the left hand end B of the pipe and prevents downward movement; thus, the tractor unit 12 actually exerts an upward force opposite the point B. The smaller auxiliary tractor unit 14 is adapted to engage and support the right hand end of the pipe C and to exert an upward or lifting force against this end of the pipe.

Figure 2:
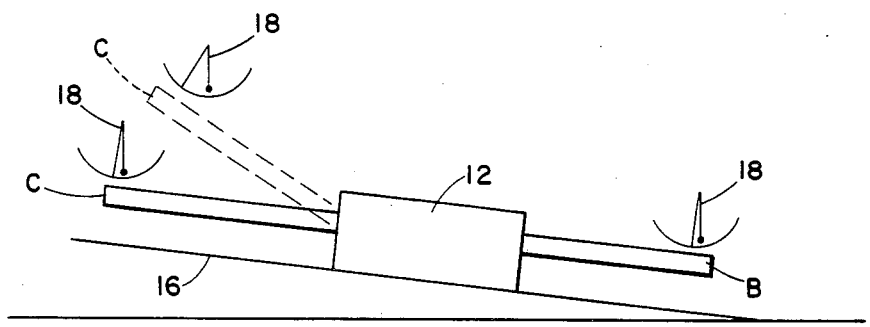
FIG. 2 is diagrammatic view of pipe to be bent starting at an angle with respect to the horizontal and showing the voltage generating devices (transducers) of the present invention in terms of pendulums (potentiometers)

Since it rarely happens that the pipe bending operation is located on level ground, FIG. 2 shows a situation where the pipe bending operation occurs on ground 16 which is at a slight angle to the horizontal. FIG. 2 also diagrammatically illustrates the pendulum devices 18 of the present invention which are employed at the ends of the pipe B and C; the dotted line position on the end C is an exaggerated and somewhat diagrammatic indication of the change in the pendulum device 18 after the pipe end C has been bent upwardly.

Figure 3:
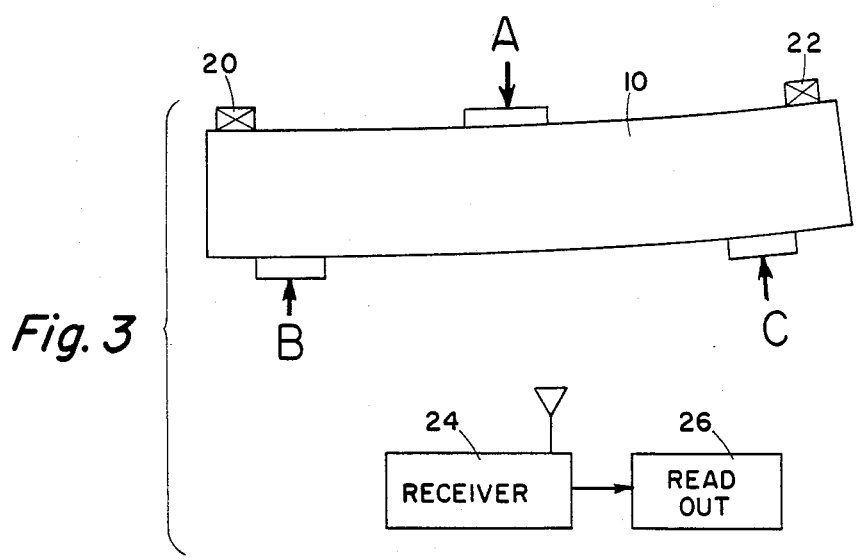
FIG. 3 is a diagrammatic representation broadly similar to FIG. 2 but showing the radio-telemetry aspects of the present invention.

FIG. 3 is a semi-diagrammatic representation, somewhat similar to FIG. 2, but showing the radio telemetry aspects of the present invention. The pendulum type devices 18 shown in FIG. 2 are incorporated into transmitting units generally designated by the reference characters 20 and 22 in FIG. 3. As will hereinafter appear, each transmitter 20 and 22 will transmit a radio frequency signal whose frequency will be determined by the degree of inclination measured by the pendulum type inclonometer 18. A receiver 24 is adapted to receive the pulses from both transmitters 20 and 22. By means of the internal circuitry within the receiver 24, this receiver will be able to differentiate between the two frequencies and to provide a readout at 26 which will be the angular difference between the transmitters 20 and 22. The receiver 24 will be mounted on the tractor unit 12 adjacent to the operator. Thus, the operator can apply a bending force, release this force and check the readout at 26. If the readout at 26 is less than the angle desired, the operator can immediately apply another force and repeat the operation until the precise angular bend is produced.

BLOCK DIAGRAM ANALYSIS

Two transducer-transmitters are used operating at different frequencies. Two are necessary since the bending unit itself will seldom be set up in a completely horizontal attitude. As illustrated in FIG. 2, the results is that on the unbent pipe, both pendulums have the same inclination and the same potentiometer voltage. Then as the pipe is bent, the angle of the inclination transmitter at the end C changes causing its pendulum inclination and its potentiometer voltage to change. Thus we have a relative voltage difference between the two transmitters. This is the information we will use to find the angle of bend on the pipe.

FIG. 4 shows a block diagram of the two transducer-transmitter portions of the Radio-Telemetry Inclinometer (RTI). For the purposes of simplification, each transmitter-tranducer section is shown in this Figure as having three main conmponents: (1) a Transducer (the pendulum-potentiometer); (2) a Voltage-to-Frequency Converter; and a (3) Transmitter (1 or 2). The transducer (the pendulum and potentiometer) has its voltage applied to the voltage-to-frequency converter. The output frequency of this converter is then used to modulate a RF transmitter. FIG. 4 shows two transmitters. As shown in FIG. 2, one transducer-transmitter 18 is on the stationary end B of the pipe while the other transmitter 18 is on the bending end C of the pipe. The stationary end transducer-transmitter supplies the frequency from which the bending end transducer-transmitter's changing frequency will be referenced. This gives the RTI the ability to function starting on an unlevel plane.

FIG. 5 shows a block diagram of the receiver-decoder section. Two receivers pick up their respective signals and deliver the demodulatd frequencies originally sent by Transmitters 1 and 2 to a Signal Buffer and (square wave) Regenerator section. These two signals are then fed into a Signal Selector which alternately selects between signals 1 and 2. The Decoder and Display section accesses the difference between the two signals and displays this as the angle of bend.

THE TRANSDUCER-TRANSMITTER (FIGS. 6 AND 7)

As will hereinafter appear, each transducer-transmitter is made up of four sections: (1) an angle encoding section (the transducer) which converts a position to a voltage, (2) a voltage to frequency converter which converts the angle to a frequency, (3) a buffer-amplifier section to properly interface and amplify the signal, and a (4) transmitter which will send the encoded angle to the receiver. As indicated above, for purposes of simplification, the buffer-amplifier section is not diagrammatically illustrated in FIG. 4.

Potentiometer TP1 provides the method for angle encoding and is keyed to the shaft of the left-hand pendulum 18 shown in FIG. 2 as part of the transmitter unit 20 shown in FIG. 3. As the pipe 10 bends, the pendulum will always seek a vertical position, but will cause relative rotation of its support shaft with consequent movement of the movable arm (not shown) of the potentiometer TP1. TP1 is the variable voltage divider which provides the input for the voltage to frequency converter made up of components $U_1$, $R_1$, $R_2$, $R_3$, $R_4$, $R_5$, $R_6$, $C_1$, $C_2$, $C_3$, and TP2.

The potentiometer, TP2, is a scale factor trimmer used to adjust the voltage to frequency ratio of the voltage to frequency converter. The buffer-amplifier is made up of $U_2$ (½ of an LM358), $R_7$ and $R_8$. The output of the voltage to frequency coverter is supplied to a commercially obtained transmitter.*

*An example of a transmitter-receiver that could be used is REPCO's analog transmitter-receiver. See Repco's "Telemetry Applications Manual" (Copyright 1983), page 23.

Transmitters 1 and 2 are mirror images except for the difference in transmitting frequency. Thus TP3 corresponds with TP1 but is keyed to the shaft of the right-hand pendulum 18 shown in FIG. 2 as part of the transmitter unit 22 shown in FIG. 3. Resistors $R_9$ to $R_{16}$ correspond with resistors $R_1$ to $R_8$, respectively; capacitors $C_4$ to $C_6$ correspond with capacitors $C_1$ to $C_3$, repectively; integrated circuits $U_3$ ad $U_4$ correspond with integrated circuits $U_1$ and $U_2$, repectively; and TP4 corresponds with TP3.

Transmitters 1 and 2 are preferably powered by 9V mercury batteries.

THE DIGITAL DECODER (FIG. 9)

The digital decoder section consists of an updown counter, liquid cystal display (LCD) and latches for the display as well as timing and control circuits to initialize and integrate the previously mentioned circuits. The updown counter consists of integrated circuits $U_6$, $U_7$, $U_8$. The liquid crystal display and associated latches to drive the display consists of the LCD itself, $U_{11}$, $U_{12}$, and $U_{13}$. The timing and control circuits are made up of integrated circuits $U_{5A}$, $U_{5B}$, $U_{9A}$, $U_{9B}$, and $U_{18}$.

Upon start up $R_{17}$ and $C_7$ in conjunction with integrated circuit $U_{14B}$ and $U_{14C}$ provide for initialization of the timers $U_{5A}$, $U_{5B}$, $U_{9A}$, and $U_{9B}$ to the proper initialization state. The output of $U_{14B}$ through $U_{16L}$ loads the display latches $U_{11}$, $U_{12}$, $U_{13}$ with zeros and resets counter $U_{18}$ to zero. Power up circuit $R_{19}$, $C_8$, and $U_{14A}$ through $U_{16J}$ initializes $U_{5A}$ to the proper start up stage after it is initially cleared by $U_{14C}$.

After power up, control is taken over by the timer string consisting of $U_{5A}$, $U_{5B}$, $U_{9A}$, $U_{9B}$, and $U_{18}$. $U_{5A}$ is a one second timer which in conjunction with binary counter $U_{18}$ allows the selection of transmitter 1 or transmitter 2 through AND gates $U_{17J}$ and $U_{17K}$. The purpose of $U_{18}$ is threefold: (1) to count one second intervals, (2) to control the counter string made of counting up or down, and (3) to select proper inputs to the counter string by AND gates $U_{17J}$ and $U_{17K}$. When channel 1 is selected during the first one second period, the counter string counts up for one second; while, during the second one second period, the counter string counts down. This means over the first one second period it averages the angle of transmitter 1, and over the second one second period it averages transmitter 2. The end result is the average of angle 1 minus the average of angle 2, which is the angle of the total pipe bend.

The angle of the total pipe bend or the difference between transmitter 1 and transmitter 2 angle is stored in the counter string at the end of two seconds. This result is then strobed into the binary coded decimal (BCD) string $U_{11}$, $U_{12}$, $U_{13}$, which drives the liquid crystal display. $U_{9A}$ strobes the resulting angle into $U_{11}$, $U_{12}$, and $U_{13}$. $U_{9B}$ is a delay timer which resets the whole process.

$U_{15C}$, $U_{15B}$, $U_{15A}$, $R_{22}$, $R_{23}$, and $C_{13}$ make up a 60Hz oscillator which drives the liquid crystal display backplane and supplies the necessary clock for the liquid crystal display drivers $U_{11}$, $U_{12}$, and $U_{13}$.

THE RECEIVER (FIG. 8)

The receiver is made up of six blocks: two commercially obtained receivers to match the transmitters already discussed, two square wave regenerators, and two power supplies (one for the receivers and one for the digital decoder).

Figure 9A:
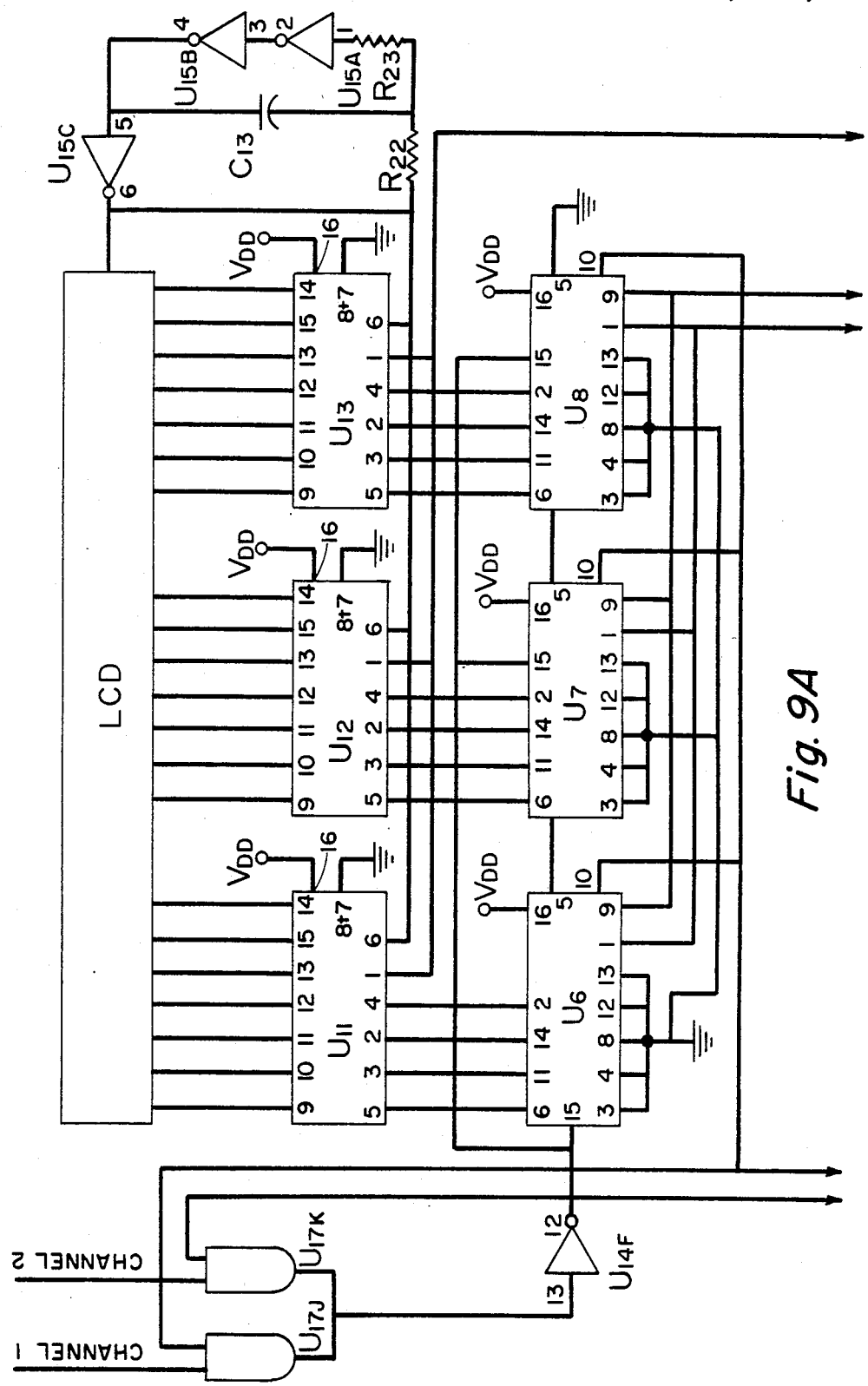
FIGS. 9A and 9B together represent a detailed circuit diagram of the digital decoder portion of the present invention.
Figure 9B:
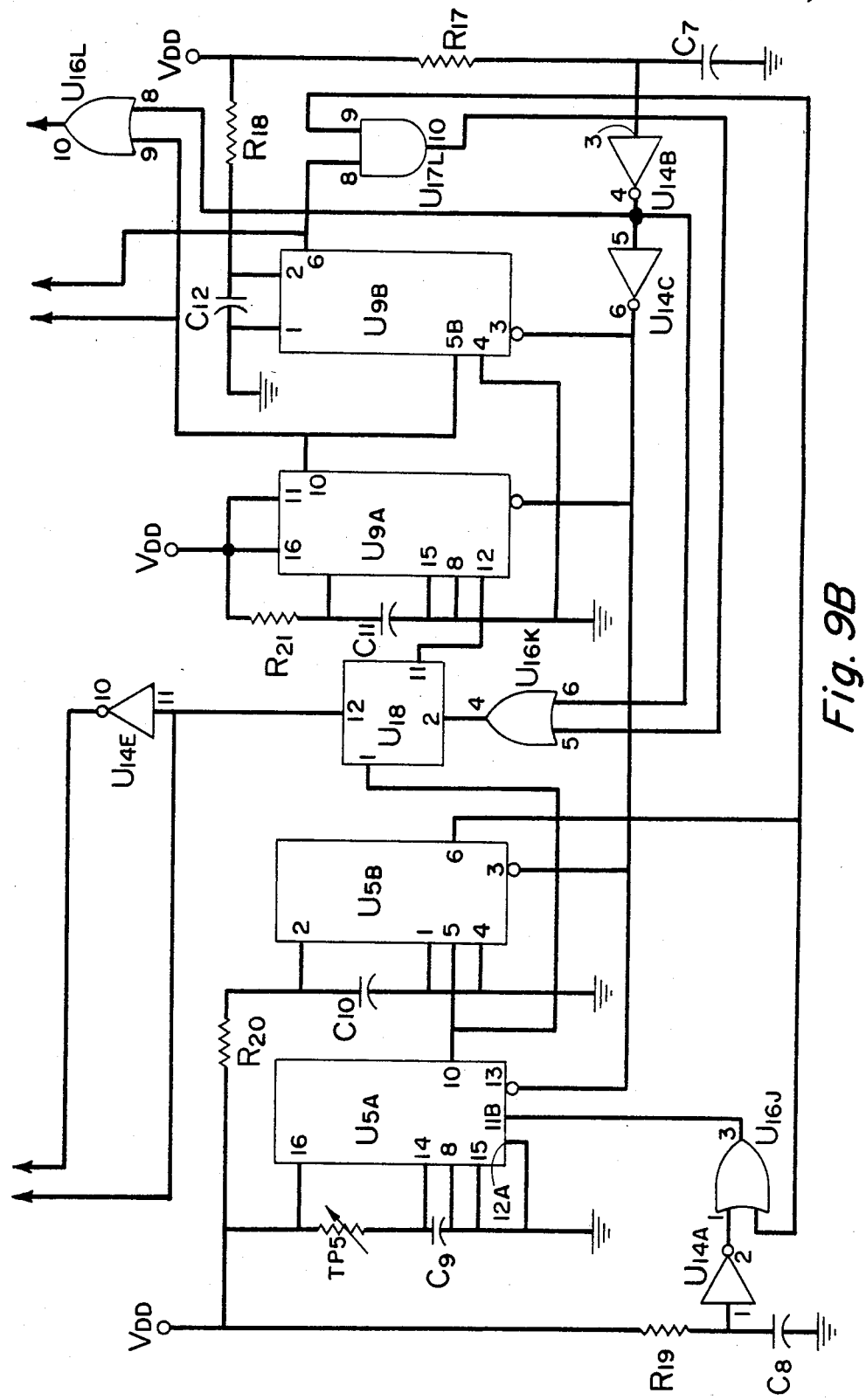

The output of Receiver 1 is the regenerated signal from Transmitter 1. This signal is then the input to the square wave regenerator consisting of $C_{14}$, $R_{24}$, $R_{25}$, $R_{26}$, $R_{27}$, $R_{28}$ and $U_{19}$. The output of $U_{19}$ is channel 1, the input to $U_{17J}$ in the digital decoder (FIG. 9). The output of Receiver 2 is the regenerated signal from Transmitter 2. This signal is then the input to the square wave regenerator consisting of $C_{15}$, $R_{29}$, $R_{30}$, $R_{31}$, $R_{32}$, $R_{33}$ and $U_{20}$. The output of $U_{20}$ is channel 2, the input to $U_{17K}$ in the digital decoder (FIG. 9).

The two power regulators are 12 Volt and 5 Volt supplies. The 12 Volt regulator consisting of $C_{16}$, $C_{17}$, and $U_{21}$ supply power for Transmitters 1 and 2. The 5 Volt regulator consisting of $C_{18}$, $C_{19}$, and $U_{22}$ supply power (+VDD) for the digital converter.

PARTS LIST

All resistors, unless otherwise stated, are ±10%, ¼ watt.

Figure 6:
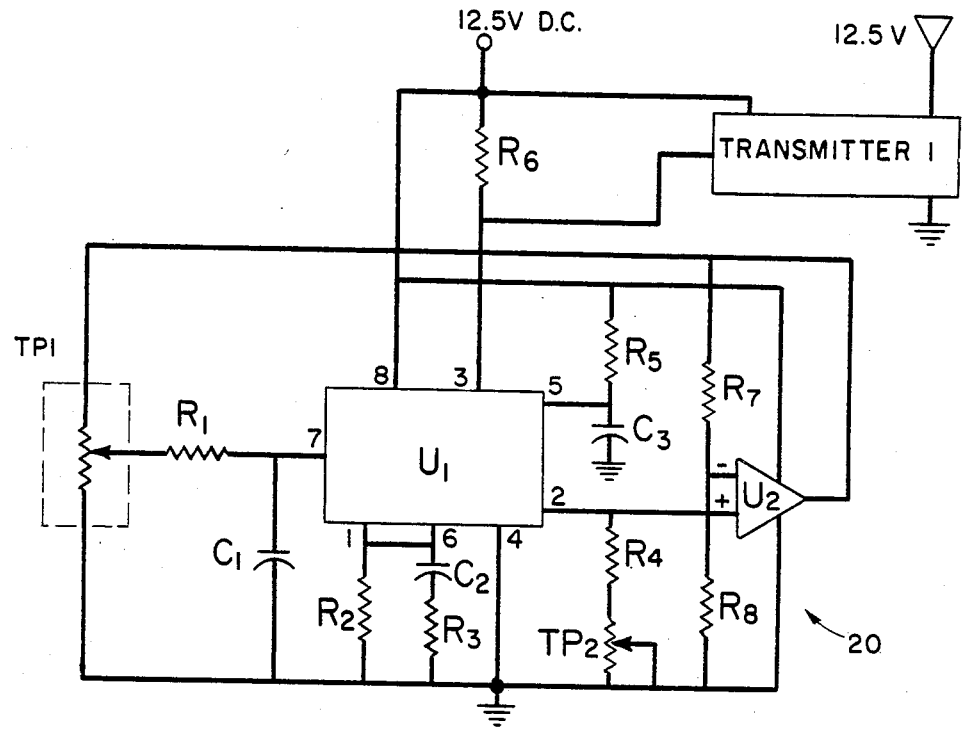
FIG. 6 is a detailed circuit diagram of the first transducer-transmitter portion of the present invention.
Figure 7:
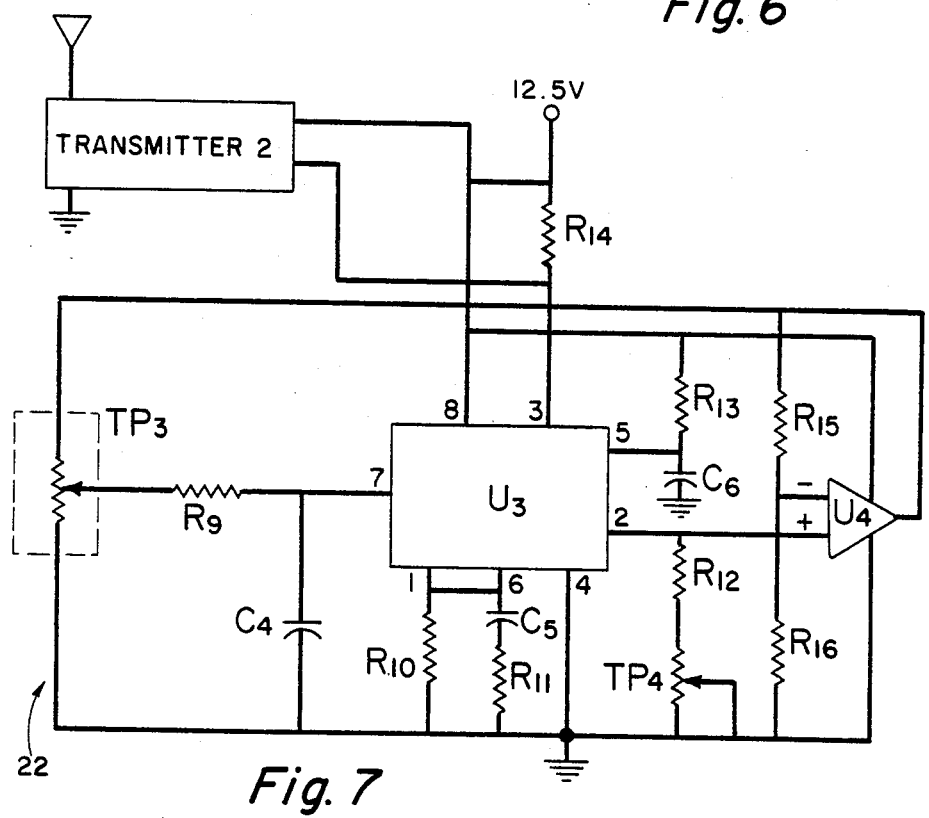
FIG. 7 is a detailed circuit diagram of the second transducer-transmitter portion of the present invention.

TRANSMITTERS (FIGS. 6 AND 7) PARTS LIST $R_1$, $R_9$—39K ohm
$R_2$, $R_{10}$—40K ohm*
$R_3$, $R_{11}$—47 ohm
$R_4$, $R_{12}$—12.1K ohm*
$R_5$, $R_{13}$—6.81K ohm* ±1%
$R_6$, $R_{14}$—22K ohm
$R_7$, $R_{15}$—30.1K ohm*
$R_8$, $R_{16}$—18K ohm*
$C_1$, $C_4$—1 μF
$C_2$, $C_5$—1 μF
$C_3$, $C_6$—0.01 μF*
TP1, TP3—10K linear *
TP2, TP4—5K*
$U_1$, $U_3$—LM331
$U_2$, $U_4$—LM358A
Transmitter—commercially obtained
    example—REPCO's analog transmitter. See Repco's "Telemetry Applications Manual", page 23.
*Low temperature coefficient

DIGITAL DECODER (FIG. 9) PARTS LIST $R_{17}$—100K ohm
$R_{18}$—10K ohm $R_{19}$—1 Megaohm
$R_{20}$—33K ohm
$R_{21}$—10K ohm
$R_{22}$—10K ohm
TP5—1 Megaohm
$C_7$—1 μF
$C_8$—10 μF
$C_9$—10 μF
$C_{10}$—1 μF
$C_{11}$—0.033 μF
$C_{12}$—0.047 μF
$C_{13}$—1 μF
$U_{5A}$, $U_{5B}$—MC14528B
$U_6$—CD4510B
$U_7$—CD4510B
$U_8$—CD4510B
$U_{9A}$, $U_{9B}$—MC14528B
$U_{11}$—CD4056B
$U_{12}$—CD4506B
$U_{13}$—CD4506B
$U_{14A}$, $U_{14B}$, $U_{14C}$, $U_{14F}$—CD4069B
$U_{15B}$, $U_{15B}$, $U_{15C}$—CD4069B
$U_{16J}$, $U_{16L}$—CD4071B
$U_{17J}$, $U_{17K}$, $U_{17L}$—CD4081B
$U_{18}$—CD4024B
One three digit LCD

Figure 8:
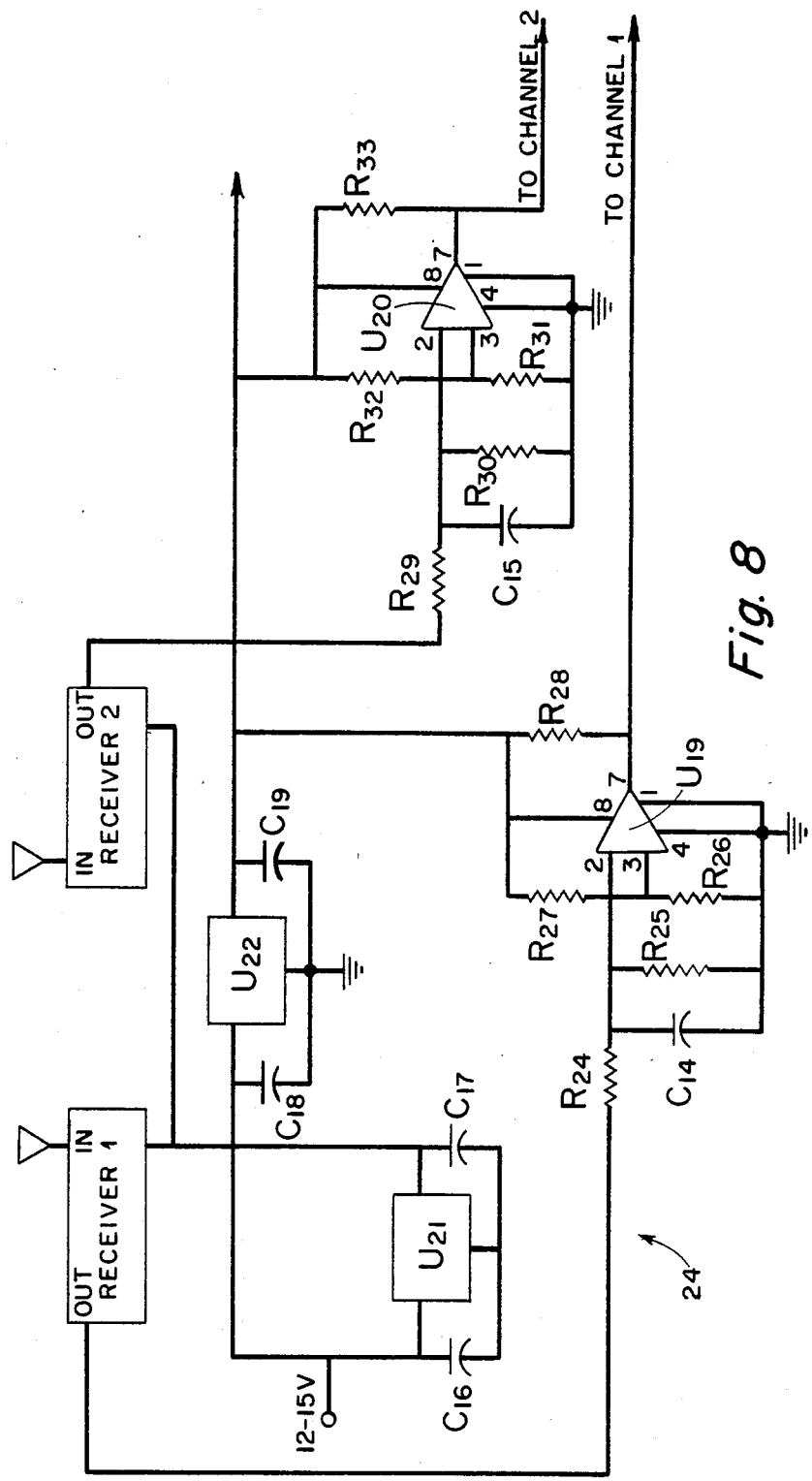
FIG. 8 is a detailed circuit diagram of the receiver portion of the present invention.

RECEIVER (FIG. 8) PARTS LIST $R_{24}$, $R_{29}$—240K ohm
$R_{25}$, $R_{30}$—47K ohm
$R_{26}$, $R_{31}$—10K ohm
$R_{27}$, $R_{32}$—150K ohm
$R_{28}$, $R_{33}$—1K ohm
$C_{14}$, $C_{15}$—110 pF
$C_{16}$, $C_{17}$, $C_{18}$, $C_{19}$—0.5 μF solid tantalum
$U_{19}$—LM311
$U_{20}$—LM311
$U_{21}$—LM7812
$U_{22}$—LM7805
Receiver—commercially obtained (see transmitter parts list)

What is claimed is:

1. A method for determining the bend in a section of a pipe which comprises supporting the pipe section on a conventional pipe bending apparatus which consists essentially of a device for holding the pipe section in a relatively horizontal position, for maintaining a first end of the pipe section in a relatively fixed position and for exerting a transverse force against a second and opposite end of the pipe section for creating a bend in the pipe section between the two ends thereof; mounting a first transducer on the first end of the pipe section, the first transducer providing a variable voltage depending upon the angle of the first end of the pipe section relative to the horizontal, mounting a second transducer on the second end of the pipe section, the second transducer providing a variable voltage depending upon the angle of the second end of the pipe section relative to the horizontal, exerting a bending force at the second end of the pipe section to create a bend in the pipe section beween the two ends thereof, converting the voltage produced by the first transducer into a first radio frequency signal whose frequency varies with the strength of the voltage produced by the first transducer, converting the voltage produced by the second transducer into a second radio frequency signal whose frequeny varies with the strength of the voltage produced by the second transducer, receiving the first and second radio frequency signals in a receiver capable of determing the the difference in frequency between the two signals, differentiating the two radio frequency signals in the receiver, and providing a readout based upon this differentiation in terms of the angular difference between the two ends of the pipe section.

2. Apparatus for determining the bend in a section of a pipe which is to be bent in a pipe bending system of the type adapted to hold the pipe section in a relatively horizontal position, to maintain a first end of the pipe section in a relatively fixed position and to exert a transverse force against a second and opposite end of the pipe section for creating a bend in the pipe section between the two ends thereof; comprising a first transducer mounted on the first end of the pipe section, the first transducer providing a variable voltage depending upon the angle of the first end of the pipe section relative to the horizontal, a second transducer mounted on the second end of the pipe section, the second transducer providing a variable voltage depending upon the angle of the second end of the pipe section relative to the horizontal, means for converting the voltage produced by the first transducer into a first radio frequency signal whose frequency varies with the strength of the voltage produced by the first transducer, means for converting the voltage produced by the second transducer into a second radio frequency signal whose frequency varies with the strength of the voltage produced by the second transducer, a receiver section for receiving the first and second radio frequency signals, differentiating means in the receiver section for determining the difference in frequency between the two signals, and means responsive to the differentiation means for providing a readout based upon the difference in frequency in terms of the angular difference between the two ends of the pipe section.

3. Apparatus for determining the bend in a section of a pipe as set forth in claim 2 wherein each transducer includes a pendulum suspended from a rotatable support shaft and a potentiometer having a variable resistance portion responsive to rotation of the support shaft for providing a variable output voltage depending upon the angle of the associated end of the pipe section with respect to the horizontal, whereby as the pipe section bends, the pendulum will always seek a vertical position, but will cause relative rotation of its support shaft with consequent change in the output voltage from the potentiometer.

* * * * *